United States Patent [19]
Bergman et al.

[11] 4,199,120
[45] Apr. 22, 1980

[54] FOLDING, PLUG TYPE AIRCRAFT DOOR

[75] Inventors: Burton Bergman, Kent; Brian P. Lawrence, Redmond, both of Wash.

[73] Assignee: The Boeing Company, Seattle, Wash.

[21] Appl. No.: 847,574

[22] Filed: Nov. 1, 1977

[51] Int. Cl.[2] .............................................. B64C 1/14
[52] U.S. Cl. .................................. 244/129.5; 49/255; 49/317
[58] Field of Search .............. 244/129.4, 129.5, 129.1, 244/1 R; 114/201 R; 49/247–249, 254, 255, 318, 317, 463–466; 220/324

[56] References Cited

U.S. PATENT DOCUMENTS

| | | | |
|---|---|---|---|
| 1,178,775 | 4/1916 | Albright | 49/318 |
| 1,462,402 | 7/1923 | Webster | 49/464 |
| 2,670,799 | 3/1954 | Dobbs | 220/324 |
| 2,997,751 | 8/1961 | McPherren | 49/248 |
| 3,000,063 | 9/1961 | Hoog | 49/317 |
| 3,051,280 | 8/1962 | Bergman et al. | 244/129.5 |
| 3,085,297 | 4/1963 | Linderfelt | 244/129.5 |
| 3,390,846 | 7/1968 | Stevinson et al. | 244/129.4 |
| 3,449,860 | 6/1969 | Franks, Sr. et al. | 244/465 |
| 3,506,223 | 4/1970 | Flemming | 244/129.4 |
| 3,647,169 | 3/1972 | Allwright et al. | 244/129.5 |
| 3,667,649 | 6/1972 | Thillet | 244/465 |
| 3,718,171 | 2/1973 | Godwin | 244/129.5 |

FOREIGN PATENT DOCUMENTS

1253436  11/1967  Fed. Rep. of Germany ............ 49/255

*Primary Examiner*—Galen L. Barefoot
*Attorney, Agent, or Firm*—Christensen, O'Connor, Johnson & Kindness

[57] ABSTRACT

A plug type door for a pressurizable aircraft fuselage is mounted by a door hinge assembly for swinging movement into and out of a door opening in the fuselage. The door is composed of three segments that are hinged to each other so that the door can be folded from a fully closed position in which the three segments are serially arranged to completely cover the door opening, into an unplugged position in which the three segments are oriented in a generally Z-shaped configuration. Stop members are mounted on the fuselage adjacent the door opening and cooperate with corresponding stop members on the door to plug or secure the door in the door opening when the door is in a closed position. The stop members on the door and the door opening deregister as the door is folded to free the door for outward swinging movement about the hinge assembly.

18 Claims, 14 Drawing Figures

FOLDING, PLUG TYPE AIRCRAFT DOOR

BACKGROUND OF THE INVENTION

The present invention relates to door assemblies for closing a door opening in a wall and more particularly to a plug type aircraft door that is constructed to withstand internal cabin pressure when in a closed position and yet that can be opened outwardly from the fuselage through the door opening.

Aircraft having pressurizable passenger cabins normally employ ingress and egress doors that are generally referred to as plug type doors. Plug type doors are seated in the fuselage door opening and secured in that opening so that when the passenger cabin is pressurized, the internal pressure on the door will not cause the door to blow out. Such plug type doors are normally larger in at least one dimension, either horizontally or vertically, than the door opening. Thus such doors either must be opened inwardly, utilizing valuable passenger deck space, or must be constructed so that they can be moved outwardly through a door opening that is smaller than the door itself.

Since cabin space is at a premium, most commercial aircraft in use today utilize plug type doors that are modified in configuration during the opening sequence to reduce the size of the door relative to the opening or are reoriented relative to the door opening during the opening sequence so that the doors can be moved outwardly through the door opening. One such door is disclosed in U.S. Pat. No. 3,051,280 to Bergman, Eisenhart and Wood. The door disclosed in the Bergman et al. patent has retractable tabs mounted at the upper and lower edges of the door that seal the gap between the upper and lower edges of the door and the lintel and sill, respectively, of the door opening when the door is closed. The retractable tabs are moved inwardly by an actuator during the opening sequence to decrease the vertical dimension of the door. The Bergman et al. hinge mechanism then allows the door to be moved inwardly, rotated through approximately 90° and then swung outwardly through the door opening. Since, however, the door must rotate inwardly, valuable cabin space must always remain free of obstacles so that the door can be opened at any time.

It is accordingly a broad object of the present invention to provide a plug type door for an opening in a wall, and specifically for a door opening in an aircraft fuselage, that is configured so the door can be swung through the door opening without substantial inward movement relative to the door opening; that is relatively simple in design when compared with prior art plug type doors; and that reduces or virtually eliminates the seal abrasion problems of the prior art.

SUMMARY OF THE INVENTION

In accordance with the foregoing objects, and other objects that will become aparent to one of ordinary skill upon reading the following specification, the present invention is embodied in a plug type door assembly for covering an opening in a wall, for example, a doorway in the fuselage of an aircraft. The plug type door of the present invention comprises a segmented door panel having first and second end segments and an intermediate segment. When the door is closed, the segments are serially arranged in a generally continuous path so that the peripheral edge portions of the door segments lie adjacent the periphery of the doorway so as to close the doorway. Disengageable stop means are operatively associated with the doorway and the door for securing the door in the doorway against fluid pressure exerted upon one side of the closed door. A seal means is operatively associated with the door to seal the peripheral edge portions of the door segments to the periphery of the doorway when the door is in a closed position. Hinge means join the end segments of the door to the intermediate segment so that the door can be folded at the junctions of the end segments and the intermediate segment into a generally Z-shaped configuration. As the door is folded into the Z-shaped configuration, and the end segments of the door move toward each other, the movement of the end segments disengages the stop means, thus freeing the door from the doorway.

In a preferred form of the invention, the door and doorway have generally hexagonal shapes. The intermediate segment spans the central portion of the door between two opposite apexes of the hexagon. As the door is folded into its Z-shaped configuration, not only are the opposite ends of the door moved away from the corresponding portion of the periphery of the doorway as the end segments move toward each other, but also the side portions of the end segments are translated away from the corresponding side portions of the doorway. Thus, as the door is folded into its Z-shaped configuration, the seal means associated with the peripheral edge portions of the door are spaced from the doorway periphery. The only dimension of the door that remains substantially the same as the corresponding dimension of the doorway is the span of the intermediate segment across the central portion of the doorway. The seal means associated with the peripheral edge portions of the intermediate segment of the door are retracted during the folding operation so as to disengage that portion of the seal from the door opening, thus completely freeing the door from the doorway and minimizing abrasion and wear on any portion of the seal.

BRIEF DESCRIPTION OF THE DRAWINGS

A better understanding of the present invention can be derived by reading the ensuing specification in conjunction with the accompanying drawings, wherein.

DETAILED DESCRIPTION OF THE INVENTION

Figure 1:
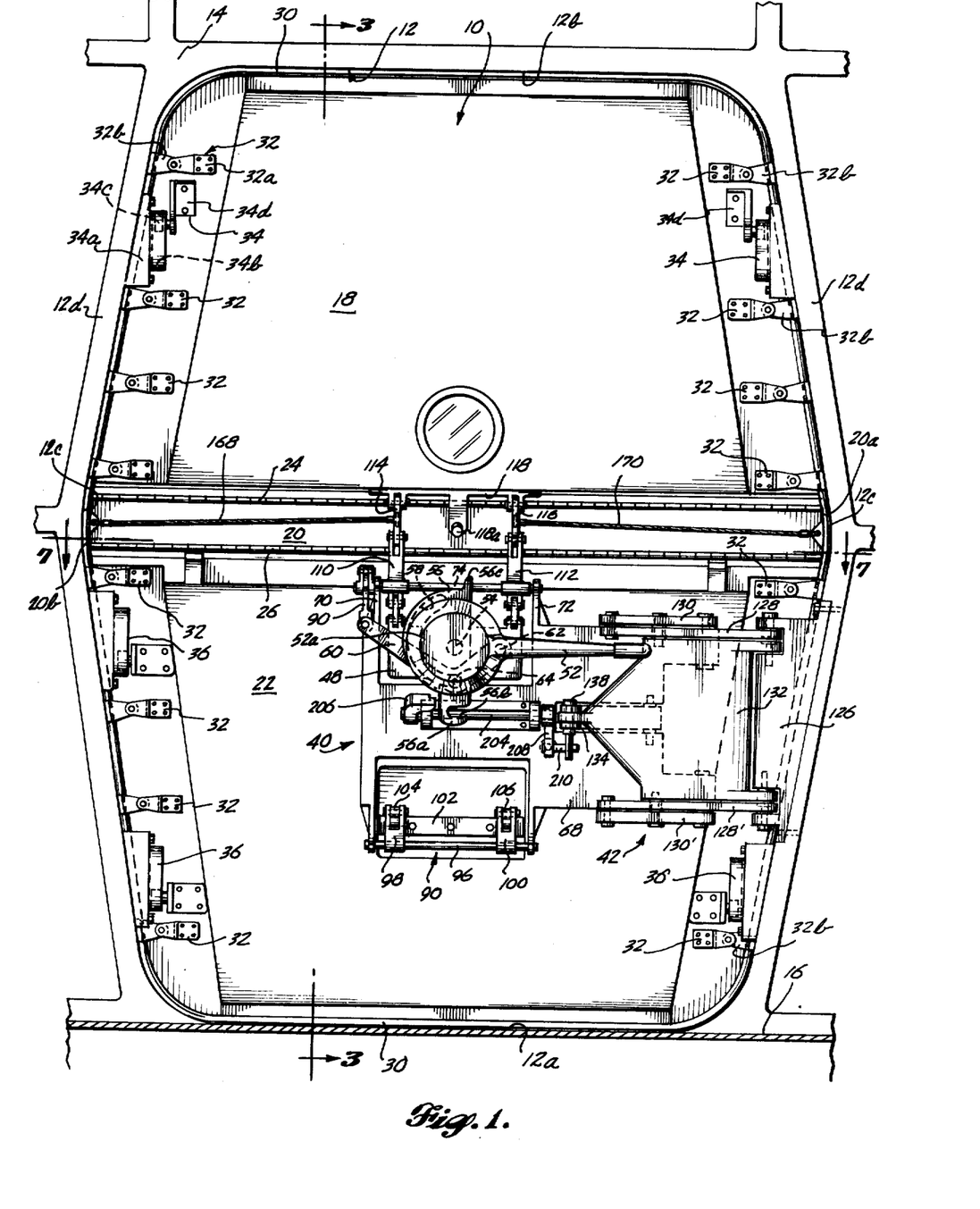
FIG. 1 is a plan view of the door of the present invention looking outwardly from the inside of the door and showing the door actuating apparatus, hinge mechanism and door segments in a fully closed position.
Figure 2:
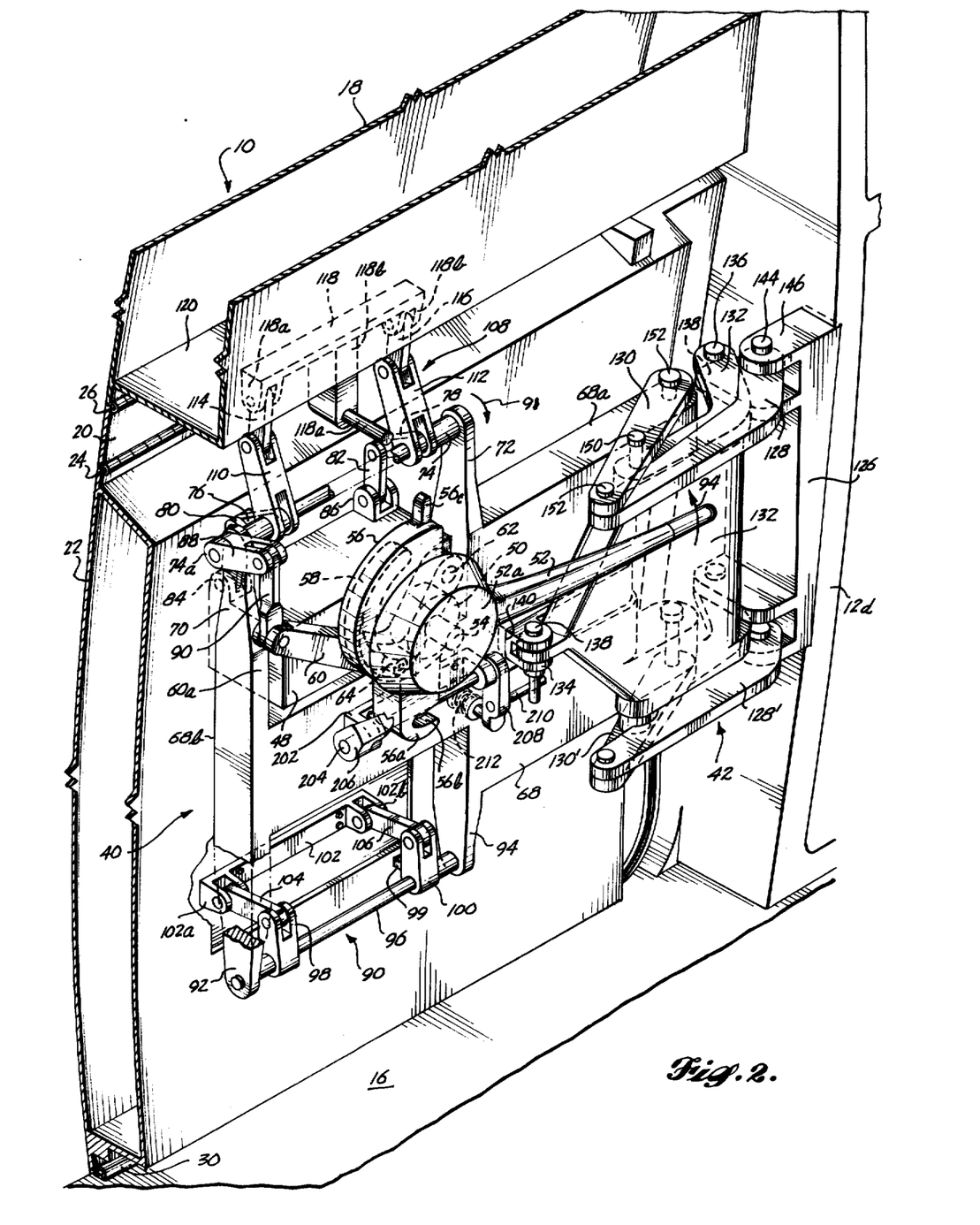
FIG. 2 is an enlarged isometric view of the actuating apparatus and hinge mechanism of the door illustrated in FIG. 1.
Figures 3, 6:
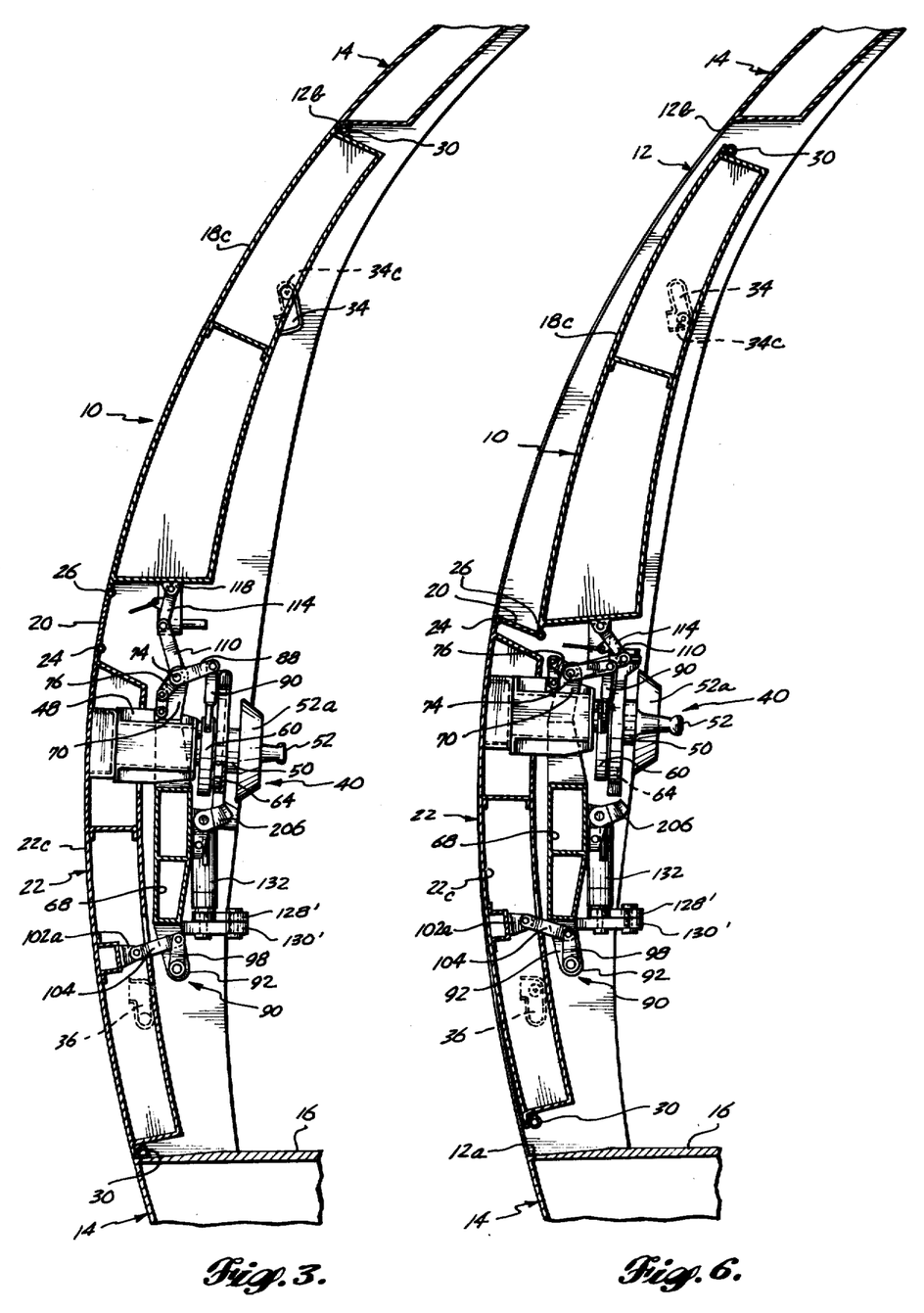
FIG. 3 is a longitudinal sectional view of the door taken along section line 3—3 of FIG. 1.
FIG. 6 is a longitudinal sectional view of the door taken along section line 6—6 of FIG. 4.

Referring first to FIGS. 1, 2 and 3, the door 10 of the present invention functions to close an opening 12 in a wall structure 14. In the preferred form of the invention, the door 10 is a plug type door for closing a passenger ingress and egress doorway from the pressurized passenger cabin of an aircraft to outside the fuselage. The invention will be described in terms of its utilization as a plug type door for an aircraft, however, it is to be realized that the door can be employed for closing doorways or other openings in all structures, but especially those that require a pressure seal and means for securing the door in the door opening against internal or external fluid pressure on the door. Thus, for purposes of the ensuing description, the door opening will be referred to as a fuselage doorway, while the wall structure in which the doorway is situated will be referred to as an aircraft fuselage.

The preferred peripheral configuration of the doorway 12 is a generally hexagonal shape with the junctions or apexes of the sides of the hexagon smoothly rounded. Moreover, the doorway is preferably elongated in the vertical dimension and foreshortened in the transverse dimension to conform the height and width dimensions of the doorway to generally acceptable dimensions for normal passenger ingress and egress. For ease of manufacture and interchangeability of the doors with doorways on both sides of the fuselage, it is also preferred that the doorway be symmetrical about a generally vertical axis. In the preferred form of the invention, the bottom portion or sill 12a of the doorway is situated adjacent the passenger deck 16 of the aircraft while the upper portion or lintel 12b is spaced upwardly from the bottom portion 12a by a distance sufficient to allow ingress and egress for passengers of normal height. The central portion 12c of the doorway has a transverse dimension that is wider than the transverse dimension of the remainder of the doorway. The periphery of the doorway extends upwardly from the central portion 12c with converging sides merging into the upper portion 12b of the periphery of the doorway. Likewise, the sides of the doorway below the central portion 12c converge downwardly and merge into the bottom portion 12a of the doorway periphery.

The door 10 in its presently preferred form comprises three segments: an upper segment 18, an intermediate segment 20 and a lower segment 22. The upper and lower segments 18 and 22 when viewed from the inside of the fuselage can be mirror images of each other, or can be dissimilar. It is most preferred, however, that the door be symmetrical about a vertical axis so that the door is interchangeable with doorways on both sides of the fuselage. The intermediate segment 20 extends generally horizontally to span the central portion 12c of the doorway and has edge portions 20a and 20b that conform to the curvature of the central portion 12c of the periphery where the convergent upper and lower portions of the doorway periphery sides meet in a smooth, rounded curve. The vertical dimension of the intermediate segment 20 is relatively small compared to the corresponding vertical dimensions of the upper and lower segments 18 and 22. The upper segment 18 of the door has peripheral edge portions that generally conform to and lie adjacent the upper side portions and the upper portion of the periphery of the doorway. Likewise, the lower segment 22 has peripheral edge portions that converge downwardly from the intermediate segment 20 and conform generally to the shape of the lower side portions and the bottom portion of the doorway periphery. The upper horizontal edge of the intermediate segment 20 is joined to the lower horizontal edge of the upper segment 18 by a hinge 24. Likewise, the lower edge of the intermediate segment 20 is joined to the upper edge of the lower segment 22 by a similar hinge 26. Both hinges 24 and 26 are illustrated as piano hinges; however, it is understood that any suitable hinge structure can be utilized as an alternate for a piano hinge structure. The upper hinge 24 joining the intermediate segment 20 and the upper segment 18 of the door is constructed so as to allow the upper segment of the door to rotate about the hinge axis in a counterclockwise direction relative to the intermediate segment. The lower hinge 26 joining the intermediate segment 20 and the lower segment 22 of the door is also constructed to allow the lower segment 22 of the door to rotate in a counterclockwise direction relative to the intermediate segment 20. As will be explained in greater detail below, the hinge structure thus allows the door to be foreshortened in the vertical dimension. When the door is fully closed, latched and secured in the door opening, as illustrated in FIGS. 1, 2 and 3, the outer skins 18c, 20c and 22c, respectively, of the upper, intermediate and lower segments 18, 20 and 22 are serially aligned to form a generally continuous exterior surface that conforms to the exterior surface configuration of the fuselage 14, thus providing a continuous, aerodynamic fuselage and door structure when the door is closed.

A continuous peripheral fluid pressure seal 30 is affixed to the peripheral edge portions of the door adjacent the outer skins 18c, 20c and 22c. The pressure seal is of a conventional type normally utilized with aircraft doors and can be one of several seal configurations available in the art. A preferred seal configuration will be described in greater detail below. When the door is closed, the pressure seal 30 engages the periphery of the doorway 12 and a shoulder 14b (shown best in FIGS. 13 and 14) formed by a projection of the outer skin 14a of the fuselage 14 into the doorway to prevent fluid leakage between the door/doorway interface. Still referring to FIGS. 1 through 3, in the preferred embodiment of the invention, the fluid seal 30 is employed to prevent pressurized cabin air from escaping the passenger cabin when the air pressure exterior of the fuselage is less than that in the pressurized cabin. It is preferred that the seal engage the door frame 12d with sufficient force to also prevent ingress of fluid from outside the door.

Stops of two different types are employed in the preferred embodiment of the door to plug or secure the door in the opening and prevent the door from blowing out when the cabin pressure exceeds the external pressure of the fuselage. A plurality of interengageable arm type door stops 32 (hereinafter "arm stops") are employed in conjunction with a plurality of cam type door stops or guides 34 and 36 (hereinafter "cam stops" 34 and 36). The arm stops 32 are associated with both the upper and lower segments 18 and 22 of the door 10. Four arm stops 32 are employed along each of the sides of the upper segment 18 while a similar set of four arm stops 32 are employed along each of the sides of the lower segment 22. Only two of the arm stops can be seen adjacent the lower right hand portion of the door because hinge structure (to be described in greater detail below) excludes the remaining two stops from view.

Referring to the upper left hand one of the arm stops 32 as shown in FIG. 1, each of the stops comprises a door arm 32a and a doorway arm 32b. The doorway arm 32b is mounted on the door frame 12d and extends transversely into the doorway a relatively short distance at a location inside the closed position of the door 10. The door arm 32a is affixed to the door adjacent the end of the doorway arm 32b, is spaced from the door frame 12d and extends behind and overlaps the doorway arm 32b. The overlapping portions of the door arm 32a and doorway arm 32b have mutually interengageable stop surfaces that are in sliding contact when the door is in a closed position. Thus an outward fluid pressure force on the door 10 will be transmitted through the door arm 32a to the doorway arm 32b and thus to the door frame 12d. The remaining ones of the arm stops 32 are constructed in a similar manner and are spaced at predetermined locations about the periphery of the doorway so that a fluid pressure on the inside of the door will be transmitted evenly through a plurality of points to the surrounding fuselage structure to prevent the door from blowing out of the doorway when the door is closed. Although no arm stops are illustrated at the upper and lower ends of the door, it is to be understood that arm stops similar to stops 32 can be employed along the upper and lower edges of the door and door frame.

The upper and lower cam stops 34 and 36 serve three functions: first as a stop when the door is in a closed position to react negative pressure loads from outside the door; secondly to act as a fail safe stop in the event of failure of an adjacent arm stop; and primarily to guide the upper and lower door segments 18 and 22 along a predetermined path when the door is unplugged from the opening. Two upper cam stops 34 are employed at each side of the upper segment 18 of the door while two vertically spaced lower cam stops 36 are employed along each side of the lower segment 22 of the door. Each of the cam stops includes a doorway cam bracket 34a and 36a mounted on the door frame 12d and extending transversely into the doorway a short distance. The upper and lower cam brackets 34a and 36a carry guideways 34b and 36b in which followers 34c and 36c reside when the door is in a closed and plugged position. The followers 34c and 36c are rotatably mounted on follower brackets 34d and 36d, in turn affixed to the door frame adjacent the cam brackets 34a and 36a. The two upper guideways 34b each extend from an upper terminus downwardly and slightly inwardly relative to the fuselage. An outwardly extending portion joins the lower end of the downwardly and inwardly extending portion and opens outwardly to provide an exit path for the followers 34c. The four lower cam stops 36 have similar guideways 36c except that each of the guideways in the four lower stops 36 extends from a lower terminus generally upwardly and outwardly. An outwardly extending portion of the guideways joins the upwardly and outwardly extending portion of the guideways and opens outwardly relative to the fuselage to provide an exit path for the followers 36c. When the door 10 is in a closed position, the followers 34c in the two upper cam stops 34 reside at the upper terminus of the guideways 34b while the followers 36c engaging the guideways 36b in the four lower cam stops 36 reside in the lower termini of the guideways 36c. Thus the cam stops 34 and 36, in conjunction with the arm stops 32, securely fasten the door in the doorway and most will aid in preventing blowout of the door when the cabin pressure exceeds the pressure external to the fuselage, and will react any inwardly acting force on the door.

Figure 4:
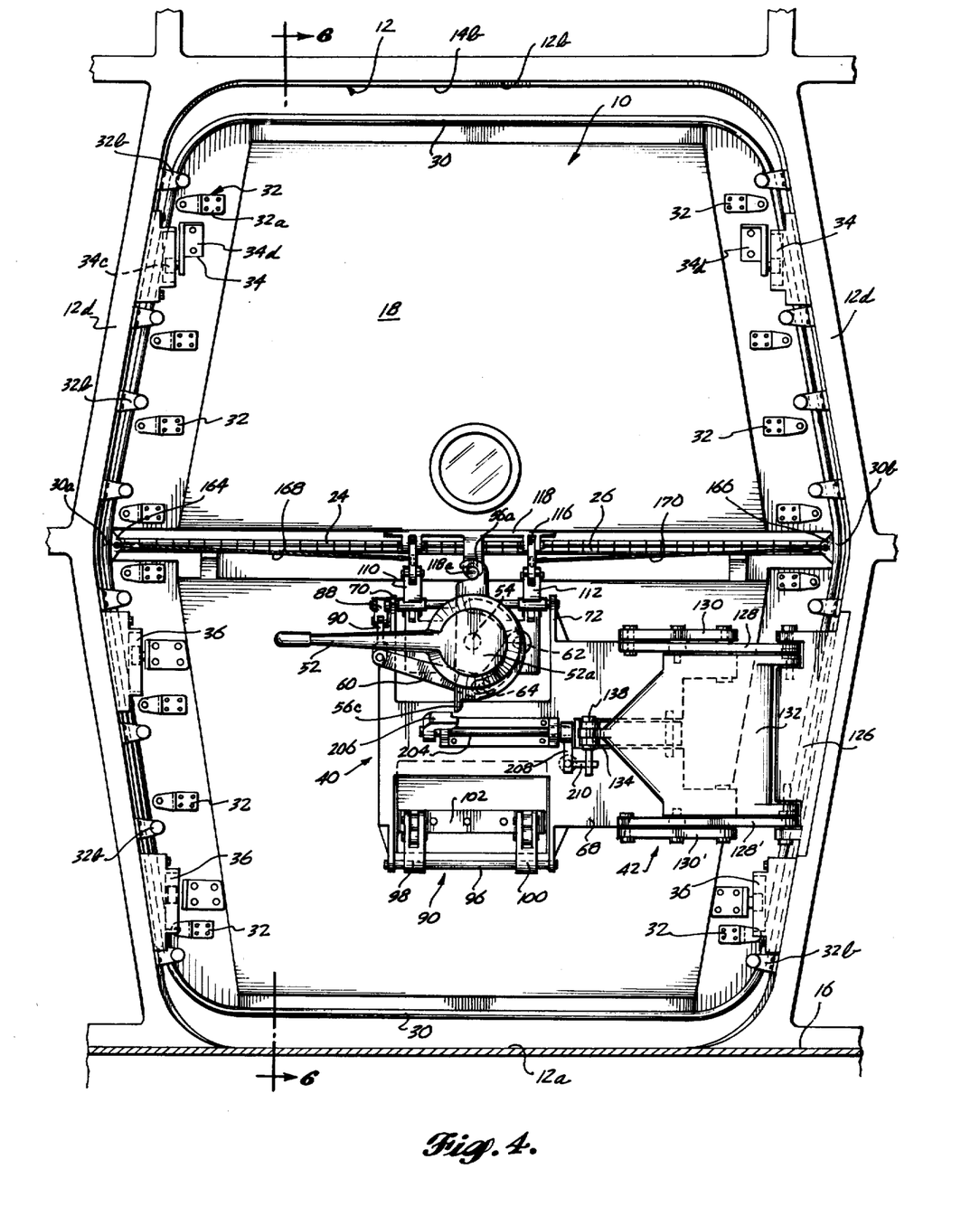
FIG. 4 is a view similar to FIG. 1 but showing the actuating apparatus and the door segments in the folded and unplugged position.
Figure 5:
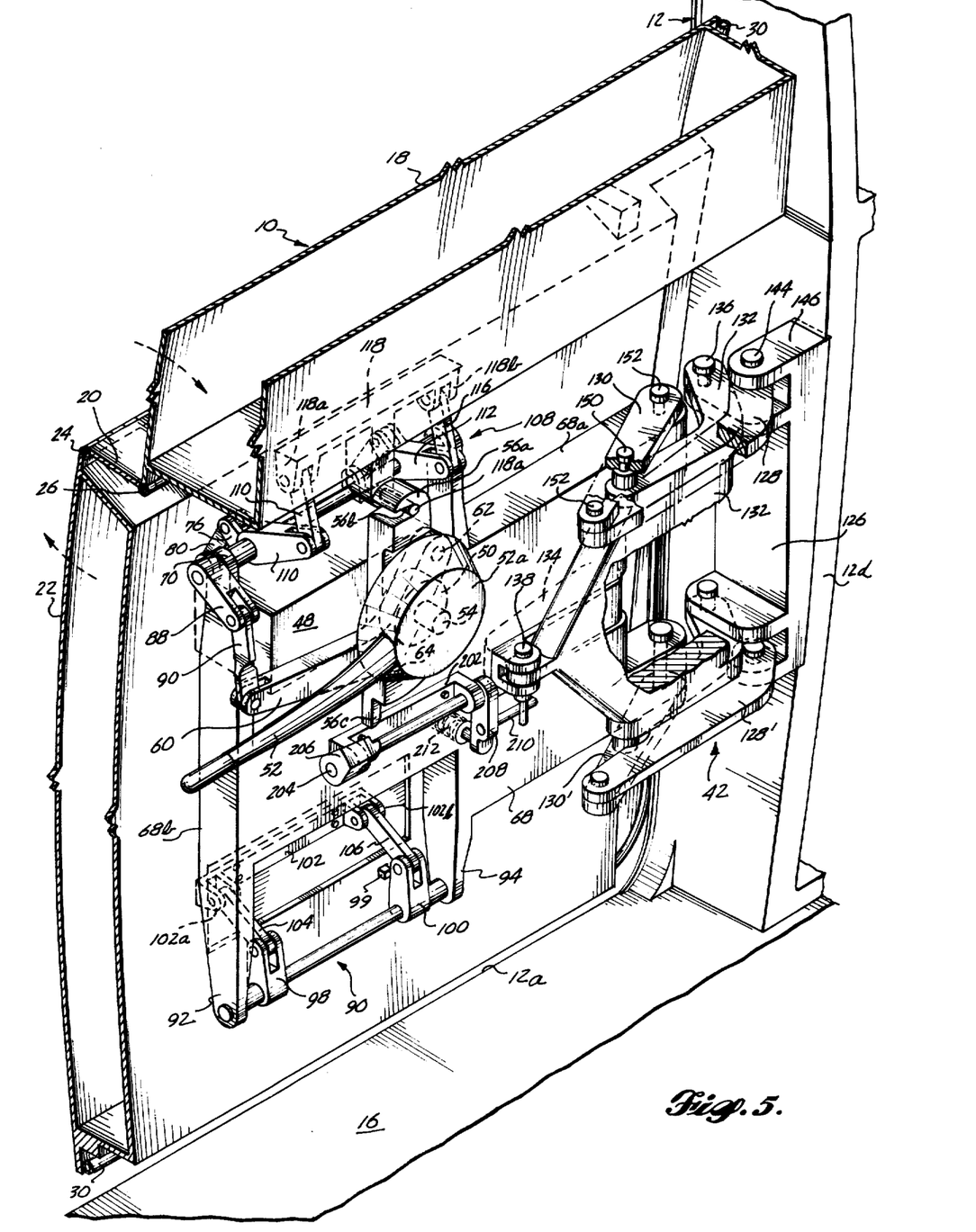
FIG. 5 is an enlarged isometric view of the actuating apparatus and hinge mechanism showing the door in an unplugged position similar to that of FIG. 4.

A door actuating assembly, generally designated 40, is located inwardly from and adjacent the lower segment 22 of the door. A hinge assembly 42 supports the door actuating assembly 40 and extends transversely to one side of the doorway where it is affixed to the door frame 12d. The door actuating assembly 40 is operably coupled to the upper and lower segments 18 and 22 of the door and, when manually actuated, functions to pull downwardly on the upper segment 18 of the door and upwardly on the lower segment 22 of the door. As this occurs, the intermediate segment 20 rotates about the hinges 24 and 26 so that the door is folded in longitudinal section into a Z-shaped configuration as shown in FIGS. 4, 5 and 6. The actuating assembly 40 is so connected to the upper and lower segments 18 and 22 as to move the upper portion 18a of the upper segment 18 downwardly and slightly inwardly relative to the doorway while the lower portion of the upper segment 18 is moved downwardly and inwardly as it rotates about the hinge 26. The upper portion 22a of the lower segment is moved upwardly relative to the doorway while the lower portion of the lower segment is moved upwardly and slightly inwardly relative to the doorway. As the upper and lower segments 18 and 22 are moved downwardly and upwardly, respectively, the intermediate segment 20 rotates about both hinges 24 and 26 from a closed position (as shown in FIG. 3) through an arc of about 110° so that the upper portion of the intermediate segment 20 resides below the lower portion of the intermediate segment 20 when the door is Z-folded (as shown in FIG. 6).

Referring to FIGS. 4 through 6, as the door is folded into its Z-shaped configuration, it is disengaged from the arm stops 32 and from the cam stops 34 and 36. Since the upper and lower segments are moved downwardly and upwardly, respectively, the door arms 32a on the upper segment are deregistered in a downward direction from the doorway arms 32b. Likewise the door arms 32a on the lower segment 22 of the door are deregistered in an upward direction relative to the doorway arms 32b. Thus the engagement surfaces of the arm stops are offset from each other, allowing the door to be swung outwardly relative to the doorway about the hinge assembly 42. As the door is Z-folded from its fully closed position, the lower portion of the upper segment 18 and the upper portion of the lower segment 22 are guided through an arcuate path by virtue of the respective interconnections to the intermediate segment 20 by the hinges 24 and 26. The upper portion of the upper segment 18 is guided by the upper guideways 34b of the two upper cam stops 34 downwardly and inwardly. Thus, as the followers 34c traverse the downwardly and inwardly oriented portion of the guideways 34b, the upper portion of the upper segment 18 is guided downwardly and inwardly so that at the completion of the Z-folding of the door, the followers 34c reside within the outwardly opening portion of the guideways 34b. Likewise, as the lower segment 22 of the door is pulled upwardly by the actuating mechanism 40, the followers 36c of the four lower cam stops ride upwardly in the guideways 36b of the four lower cam stops 36. At the completion of the Z-folding of the door, the followers 36c of the lower cam stops all reside in the outwardly opening portions of the lower guideways 36b. In this manner, the door 10 is completely disengaged from the cam stops 34 and 36 and the arm stops 32; that is, the door is unplugged from the doorway 12 and is ready to be swung outwardly to open the doorway.

The base member 48 of the actuating apparatus 40 is mounted adjacent the upper end of the lower segment 22 of the door. A shaft 50 is rotatably journalled in the base member 48. The shaft 50 is oriented generally horizontally and extends from a location adjacent the outer skin 22c of lower segment 22 inwardly to the inside of the door. The hub 52a of a manually-actuatable handle 52 is affixed to a stub shaft 54 projecting inwardly from the inner end of shaft 50. A cam member 56 is mounted on the shaft 50 at a location spaced outwardly from the hub 52a of the handle 52 and carries a cam guideway 58 that extends in a generally arcuate path about the shaft 50 and opens outwardly relative to the door. The guideway 58 has a lower portion that is situated adjacent the bottom of the shaft 50 when the handle 52 is in its normally closed position and extends in an arcuate path in a clockwise direction around the hub (when viewed from the inside of the door 10). The cam guideway 58 follows an arc that is situated at an ever increasing radius relative to the shaft as it extends upwardly and around the shaft 50. The upper end of the guideway 58 terminates above the shaft 52.

An L-shaped follower arm 60 has its one end pivotally mounted on the base member 48 via a pivot pin 62. The pivot pin 62 is located on the opposite side of the shaft 50 from the guideway 58. One leg of the follower arm 60 extends downwardly from the pivot pin 62 under the shaft 50 and joins with the other leg of the follower arm in a 90° curve. The other leg of the follower arm 60 then extends upwardly and terminates at a location spaced radially outwardly relative to the shaft from the guideway 56. A follower 64 is pivotally mounted on the central curved portion of the follower arm 60 and engages the lower portion of the guideway 58 in the cam member 56 when the actuating handle 52 is in its closed and plugged position.

The entire door 10 is suspended from a main hinge arm 68 that extends transversely across the door opening from the hinge assembly 42. The end 68a of the hinge arm adjacent the doorway periphery is coupled to the hinge assembly 42 in a manner that will be described in greater detail below. The inner end 68b of the hinge arm 68 terminates centrally of the door opening in the transverse direction adjacent and below the base member 48 of the actuating apparatus 40. Two support arms 70 and 72 that are integral with the hinge arm 68 extend upwardly from the inner end 68b of the hinge arm. The support arms 70 and 72 are spaced transversely from opposite sides of the base member 48 and have upper ends terminating at a location slightly above the base member 48. An upper support shaft 74 extends transversely between the upper ends of the support arms 70 and 72 and has its ends respectively journalled in the upper ends of the arms 70 and 72. The shaft 74 is located above the base member 48. A pair of downwardly and outwardly extending suspension arms 76 and 78 are affixed to the shaft 74. The lower ends of the suspension arms 76 and 78 are pivotally coupled, respectively, to the upper ends of a pair of upright coupling links 80 and 82. The lower ends of the links 80 and 82 are pivotally coupled to a pair of transversely spaced yokes 84 and 86, that are in turn fixed to and extend upwardly from the upper portion of the base member 48. Thus, the base member 48 is suspended from shaft 74 via suspension arms 76 and 78, coupling links 80 and 82 and yokes 84 and 86; and thus the entire lower segment 22 of the door is suspended from the main hinge arm 68.

As previously mentioned, the L-shaped follower arm 60 extends upwardly from below the main actuating shaft 50. The outer end 60a of the follower arm 60 terminates adjacent the left support arm 70 on the main hinge arm 68. The outer end 60a of the L-shaped cam arm also is located below the location of shaft 74 where it is journalled in the support arm 70. An inwardly and slightly upwardly extending actuating arm 88 is affixed to a stub shaft extension 74a of the shaft 74. The outer end of the actuating arm 88 terminates above the upper end of the follower arm 60 and is pivotally coupled to the upper end 60a of the follower arm 60 via actuating link 89.

As shown in FIGS. 1, 2 and 3, the actuating handle 52 extends transversely toward the hinge assembly when the actuating assembly is in its closed and plugged position. To unplug the door 10 from the doorway 12, the handle 52 is rotated in a counterclockwise direction as indicated by arrow 94. As the handle 52 is rotated through approximately 180° to the position shown in FIGS. 4, 5 and 6, the cam member 56 is rotated via its connection to actuating shaft 50 (also rotated through about 180°) so as to cause the arcuate guideway 58 to swing about the rotational axis of main shaft 50. As this occurs, the ever increasing radius of the guideway 58 causes the follower 64 to move downwardly relative to the shaft 50. As the follower 64 moves downwardly, the outer end 60a of the L-shaped follower arm 60 will also move downwardly. The downward movement of the outer end 60a of the follower arm pulls downwardly on the actuating link 89, which motion is transmitted via actuating arm 88 to the support shaft 74, causing the shaft 74 to rotate in a clockwise direction, as indicated by arrow 91 (FIG. 2). As the shaft rotates, the lower ends of the suspension arms 76 and 78 traverse an arcuate path in a clockwise direction with the shaft 74 pulling upwardly on coupling links 80 and 82 and thus pulling upwardly on the base member 48. As the base member 48 is pulled upwardly, the lower segment 22 of the door 10 is also pulled upwardly to deregister the arm stops 32 and to move the followers 36c upwardly in the guideways 36b from the plugged position as shown in FIGS. 1 through 3 to the unplugged position as shown in FIGS. 4 through 6.

Referring to FIGS. 1 through 3, to prevent the lower end of the door from swinging outwardly about the hinge 24 once the followers 36c reside in the outwardly opening portion of the guideways 36b a keeper linkage, generally designated 90, flexibly attaches the bottom portion of the lower door segment to the main hinge arm 68. Two keeper arms 93 and 95 extend downwardly from the inner end 68a of the main hinge arm 68 in opposite directions from the support arms 70 and 72. A transversely extending keeper shaft 96 having two parallel, upwardly extending arms 98 and 100 affixed thereto is journalled in the lower ends of the keeper arms 93 and 95. A double yoke bracket 102 is attached by suitable fasteners to the lower central portion of the lower segment 22. Each of the yokes 102a and 102b on the bracket 102 is spaced by the same distance that arms 98 and 100 are spaced on the keeper shaft 96. A pair of connecting links 104 and 106 are pivotally connected by pins at their respective ends to the yokes 102a and 102b and the upwardly extending arms 98 and 100.

When the door 10 is in its closed and plugged position (FIGS. 1 through 3), the keeper linkage 90 can pivot about the various rotational axes thereof so as to allow the followers 36c in the lower cam stops 36 to rest in the bottom of the guideways 36b as shown in FIG. 3. When, however, the door is unplugged by rotation of the actuation handle 52, the keeper linkage 90 allows the door to move upwardly and slightly outwardly as shown in FIG. 6. A stop arm 99 illustrated best in FIG. 2 extends transversely to the keeper arm 95 in a direction parallel with the keeper shaft 96 and behind the right hand arm 100. The stop arm 99 prevents the arm 100 from rotating too far in a counterclockwise direction when the door is in an unplugged position. If it were not for this stop, the bottom portion of the lower segment 22 of the door could swing out to a full extension of the arms 98 and 100 and connecting links 104 and 106. If this occurred, it would be very difficult to close the door with a single pull on the actuation handle as the lower followers 36c would not completely seat at the inner end of the forwardly opening portion of the guideways 36b. Thus a second pull would have to be exerted on the bottom portion of the door to properly seat the followers 36c so that, upon rotation of the actuation handle 52, the followers could traverse downwardly into and seat in the bottom of the upwardly oriented portion of the guideway 34b.

The upper segment 18 of the door is pulled inwardly and downwardly upon rotation of the actuation handle by coupling linkage, generally designated 108, associated with the upper shaft 74. Referring to FIGS. 1, 2 and 3, the upper segment coupling linkage includes two upwardly and slightly outwardly extending coupling arms 110 and 112, each having their lower ends affixed to the rotatable shaft 74 at spaced locations. The upper ends of the arms 110 or 112 are pivotally connected by suitable pins to connecting links 114 and 116. The upper ends of connecting links 114 and 116 are privotally connected by suitable pins links 114 and 116 to a pair of downwardly extending yokes 118a and 118b forming part of a double yoke bracket 118. The double yoke bracket 118 is affixed to a structural panel 120 that extends inwardly from the lower portion of the upper door segment 18 immediately above the upper hinge 26.

When the actuating handle 52 is in its closed position, the pivotal connections between the arms 110 and 112 and the connecting links 114 and 116 lie outboard of a plane defined by shaft 74 and the axes of the pivotal connections between connecting links 114 and 116 and yokes 118a and 118b. When the pivotal connections between the arms 110 and 112 are so located, and when an internal cabin pressure exists that is greater than the external pressure on the aircraft, the links cannot be forced across the previously mentioned plane. Thus the overcenter location of the pivotal connections of arms 110 and 112 and links 114 and 116 prevents the door from being inadvertently opened when the cabin is pressurized.

When the actuation handle 52 is rotated from its closed to its open position as shown in FIGS. 4, 5 and 6, the shaft 74 rotates in a clockwise direction, indicated by arrows 91, as previously described. As the shaft 74 rotates, the upper ends of arms 110 and 112 are swung inwardly and downwardly relative to the axis of shaft 74, pulling downwardly on the links 114 and 116 and thus pulling the lower portion of the upper segment 18 of the door downwardly and inwardly. As this occurs, the upper followers 34c associated with the upper cam stops 34 move from their seated locations in the upper portions of the downwardly and inwardly extending guideways 34b and are positioned adjacent the outwardly opening portion of the guideways 35b.

Thus, in a single movement of the actuating handle 52 from its closed position as shown in FIGS. 1, 2 and 3 to its unlocked position as shown in FIGS. 4, 5 and 6, the door is moved from a closed and plugged position to an unplugged position ready for swinging movement outwardly through the doorway. It is to be understood that the door is moved back to its plugged position by simply rotating the handle 52 in a clockwise direction, reversing the motion of the actuating linkage and thereby plugging the door 10 in the doorway 12.

To assure that the upper segment 18 of the door is secured so that it will not move upwardly during opening of the door, an upper segment locking mechanism is actuated upon rotation of the handle 52. Referring again to FIGS. 1 and 2, a radial arm 56a extends downwardly from the cam member 56 when the actuating handle 52 is in its closed position. As the actuating handle is rotated approximately 180° to its open position, the downwardly extending arm rotates through the same arc and is moved to an upright position as shown in FIGS. 4 and 5. The end of the arm 56a carries a slot that engages a pin 118a as the arm 56a rotates toward its upright position. The pin 118a extends inwardly from a mounting bracket 118b in turn connected to the central portion of the double yoke bracket 118. Thus, as the upper segment 18 of the door moves downwardly and inwardly, so does the pin 118a. The pin 118a and the mounting bracket 118b are so sized and positioned that the slot 56b in the radial arm 56a will engage the pin 118a when the actuation handle 52 is in its unlatched position. The door is thereby secured against being inadvertently moved upwardly while the door is in an open position.

Additionally, a latch mechanism is provided to prevent the handle 52 from being rotated back to its plugged position when the door is open. A small tab 56c extends upwardly from the upper portion of the cam member when the actuating handle is in a closed position. As the actuating handle is rotated through 180°, the tab is moved to the bottom of the handle assembly. The latch mechanism 200, mounted on the main hinge arm 68 below the main shaft 50 and cam member 56, engages the backside of the tab 56c as the door is opened. The latch mechanism 200 includes a mounting bracket 202 carrying a horizontally oriented shaft 204. An arm 206 is affixed to the latch shaft 204 and extends upwardly and inwardly when the door is in a closed position. A second arm 208 extends downwardly from the opposite end of the shaft and carries at the end opposite the shaft connection a pin that extends horizontally and parallel to the shaft 204 toward the main hinge link 132. An extension of the pivot pin 138 coupling the main hinge link 132 to the connecting link 134 extends downwardly behind the pin 210 and engages the pin 210 when the door is in a closed position. A biasing spring 212 is mounted between the main hinge arm 68 and the pin carrying arm 208 to exert a biasing force on the arm 208 which biases the latch shaft 204 in a counterclockwise direction. As the door is opened, the horizontal pin 210 moves outwardly with the main hinge arm 68 and is disengaged from the pivot pin 138, allowing the latch shaft 204 to rotate in a counterclockwise direction. As this occurs, the latch member 206 engages the tab 56c, thus preventing the actuating handle 52 from being inadvertently rotated in a clockwise direction to move the door segments to the latched position while the door is open.

For actuation of the door into its Z-fold unplugged configuration from outside the door, an exterior opening handle 122 is provided. The exterior opening handle is mounted on a hub 124 in turn affixed to a splined shaft (not shown) that is axially slidable in a mating splined recess in the main actuating shaft 50. The handle is biased toward its innermost closed position by a suitable spring mechanism (not shown). When the door is opened from the inside, the exterior handle 122 is pushed outwardly by a cam mechanism (not shown) to free it for movement with the interior handle 52. When it is desired to actuate the door from the outside, unplugging it and readying it for opening, the handle 122 is grasped at one or both of its diametrically spaced ends 122a and 122b and pulled outwardly so that it is spaced from the outer surface of the door 10. An internal stop (not shown) prevents the splined shaft from being pulled all the way out of the main actuating shaft 50. The handle is shown in the extended position in FIG. 8. When the exterior handle 122 is rotated, the main actuating shaft 50 is rotated in a manner identical to that which occurs when the interior actuating handle 52 is rotated, causing the actuating apparatus 40 to function in a manner identically to that occurring when the door is opened from the inside.

Figure 7:
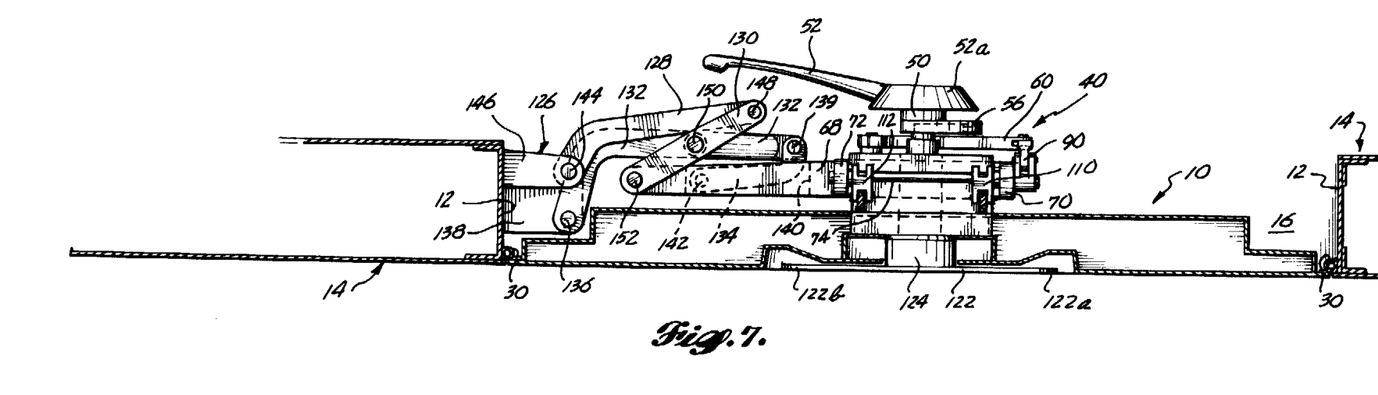
FIG. 7 is a cross sectional view of the door taken along section line 7—7 of FIG. 1.

Referring now to FIGS. 7 and 1 in conjunction with the isometric view of FIG. 2, the main hinge arm 68 on which the actuating assembly 40 is mounted extends transversely from the central location of the actuating assembly 40 toward the periphery of the doorway 12, terminating short of the periphery of the doorway 12. The main hinge arm 68 is coupled by several links, described in greater detail below, to a doorway hinge bracket 126. As can be seen in FIGS. 2 and 7, a plurality of links 128, 128', 130 and 130', 132 and 134 interconnect the main hinge arm 68 to the hinge bracket 126. The links are all pivotally coupled at their ends for movement about upright or generally vertical pivot axes. For purposes of concision, further discussion of links 128' and 130' will be omitted as their operation and function in the hinge assembly 42 is identical to that of links 128 and 130. Still referring to FIGS. 1, 2 and 7, the main link 132 is pivotally connected at its upper end by pin 136 to an upper flange 138 on the hinge bracket 126. The main hinge link 132 extends inwardly relative to the fuselage from its pivotal connection to the hinge bracket and in a L-shaped curve extends parallel to and along the inward side of the main hinge arm 68, terminating at the central portion of the main hinge arm 68. The terminus of the main hinge link 132 is coupled to the main hinge arm 68 via the connecting link 134. The terminus of the main hinge link 132 is pivotally coupled by pin 139 to a first end of the coupling link 134. The coupling link 134 extends outwardly relative to the door and into a slot 140 located in the main hinge arm 68 outwardly from the connecting link 134. The connecting link 134 then turns in an L-shaped curve back toward the door periphery but terminates short of the end of the main hinge arm 68 adjacent the door periphery and is there pivotally coupled by pin 142 to the main hinge arm 68. Thus, the main hinge link 132 and the connecting link 134 serve as the primary supports for the main hinge arm 68 and thus the entire door.

Programming links 128 and 130 adjust the lateral movement of the door as it is swung outwardly about the pivot pin 136. The first programming link 138 is L-shaped and is pivotally coupled at the short leg of the L by pivot pin 144 to a second bracket 146 located at the upper end of the hinge bracket 126. The end of the long leg of the first programming link 128 extends inwardly to the L-shaped curve and then toward the central portion of the door. The first programming link 138 terminates at its other end short of the location of the pivot pin 139 connecting the main hinge link 132 to the connecting link 134. The second programming link 130 is pivotally connected at one end by pin 148 to the end of the long leg of the first programming link 128, extends across and above the main hinge link 132 where the central portion of the second programming link 130, is pivotally coupled to the main hinge link by a pin 150 and terminates at a second end above the end of the main hinge arm 68 adjacent the door periphery. At that location, the other end of the second programming link 130 is pivotally connected by pin 152 to the main hinge arm 68.

Figure 8:
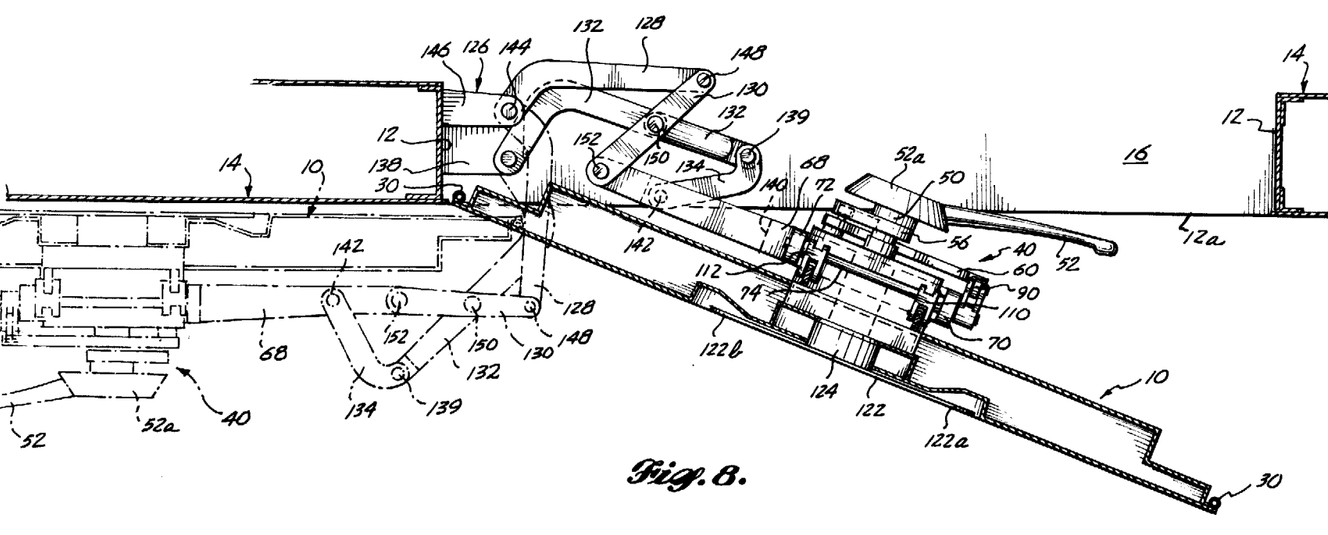
FIG. 8 is a view similar to FIG. 7 showing the position of the hinge mechanism when the door is partially opened and in ghost outline when the door is fully opened.
Figure 9:
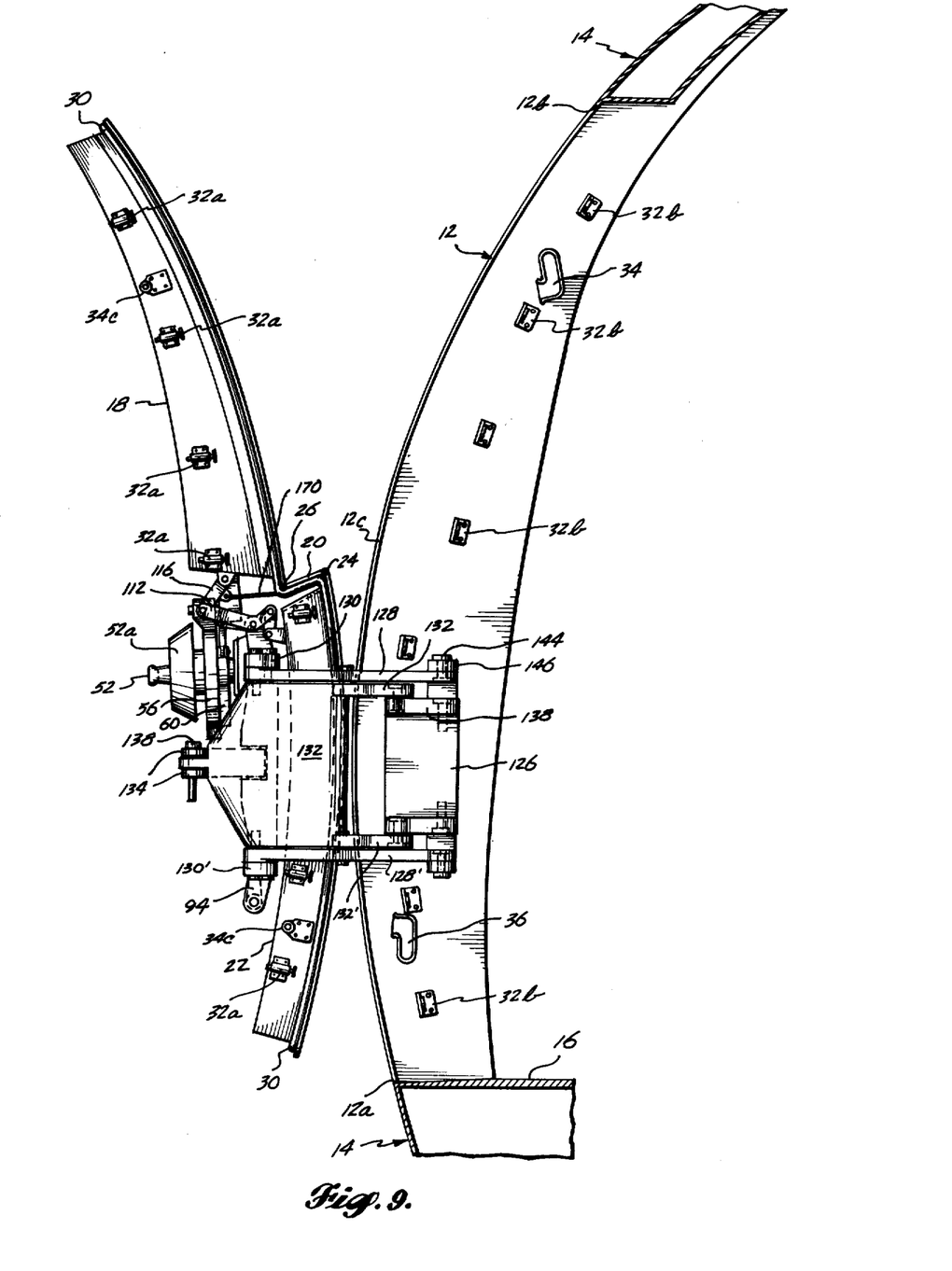
FIG. 9 is a longitudinal sectional view across the doorway showing the door in a fully opened position.

Referring now to FIGS. 8 and 9, as the door is swung open after it is unplugged, the main hinge link 132 swings outwardly toward the exterior of the fuselage. As the main connecting link 134 swings outwardly, the first programming link 128 causes the second programming link 130 to rotate in a counterclockwise direction. As it rotates, the main hinge arm 68 is pushed outwardly (transversely relative to the door as it opens) by the second programming link 130. The connecting link 134 follows the motion of the main hinge arm 68 and a space between the main connecting link 134 and the main hinge arm 68. As the door continues to swing outwardly from the doorway, the second programming link 130 continues to rotate in a counterclockwise direction until it is aligned in plan view with the main hinge arm 68. Thus the main hinge arm 68 and the entire door 10 are moved outwardly by a distance slightly less than twice the distance between the pivot pin 150 connecting the second programming link to the main hinge link and the pivot pin 152 connecting the second programming link to the end of the main hinge arm 68. When the door is fully open as shown in ghost outline in FIG. 8 and as shown in FIG. 9, the short leg of the main hinge link 132 extends outwardly and slightly away from the periphery of the doorway while the long leg of the main hinge link 132 thereafter extends outwardly and back in the direction of the periphery of the doorway. Thus, by the coaction of the positioning of the outer end of the long arm of the main hinge link 132 and the operation of the programming links 128 and 130, the door is positioned almost completely away from the door opening 12 to allow full use of the doorway without any substantial blockage by the open door. It is to be noted that the hinge linkage operates in a manner in conjunction with the Z-folded door to not require any interior cabin space as the door is opened, as is the case with prior art doors. Moreover, the hinge assembly 42 is relatively simple to manufacture, easy to service and requires little maintenance.

Figure 12:
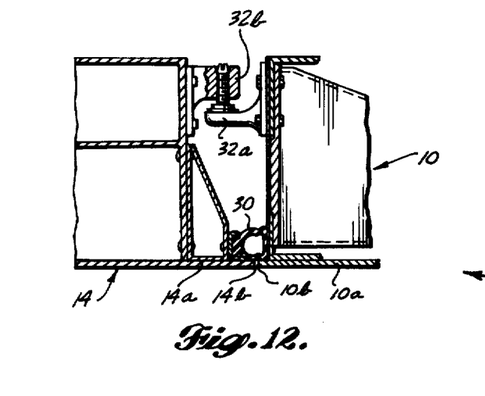
FIG. 12 is a sectional view taken along section line 12—12 of FIG. 10.
Figure 13:
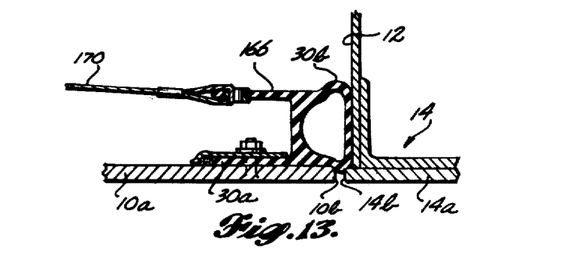
FIG. 13 is a sectional view taken along section line 13—13 of FIG. 10.

As previously mentioned, a pressure seal 30 is affixed to the interior peripheral edge portion of the door, as shown in FIGS. 1 and 12. As best seen in FIGS. 12 and 13, the seal is of the resilient hollow tubular type having a substantially tangential flange 30a formed integrally therewith. The seal is preferably formed of a synthetic elastomeric material. The flange 30a is abutted against the interior surface of the outer skins 18c, 20c and 22c of the door panel adjacent the peripheral edge portions of the door segments. The tubular portion of the seal 30 extends outwardly beyond the peripheral edge portions of the door segments; and when the door is in the closed position, the seal resiliently abuts the periphery of the doorway 12 adjacent the outer skin 14a of the fuselage 14, thus sealing the entire peripheral edge portion of the door to the periphery of the door frame 12d. A small shoulder 14b formed by a small extension of the outer skin 14a of the fuselage past the door frame 12d (or otherwise suitably formed by an interior shoulder in the doorway) prevents the seal from being squeezed outwardly through the gap between the peripheral edge of the door and the fuselage skin when internal cabin pressure is exerted on the seal.

When the door is vertically foreshortened by manipulating the actuating mechanism 40 and thereby moving the upper segment 18 of the door downwardly and the lower segment 22 of the door upwardly, the seal 30 around the peripheral edge portions of the upper and lower segments moves along with the door segments, thus spacing the seal 30 from the upper portion 12b of the doorway periphery and the lower portion 12a of the doorway periphery. At the same time, because of the unique hexagonal shape of the doorway and the corresponding hexagonal shape of the door, the seal along the sides of the upper segment moves downwardly by a distance that is also sufficient to clear the shoulder 14b surrounding the periphery of the doorway 12. Likewise the sides of the lower segment 22 move upwardly a distance sufficient to laterally space the seal around the sides of the lower semgent from the lower shoulder 14b around the lower portion of the periphery of the doorway 12 as fully illustrated in FIG. 4.

Figure 10:
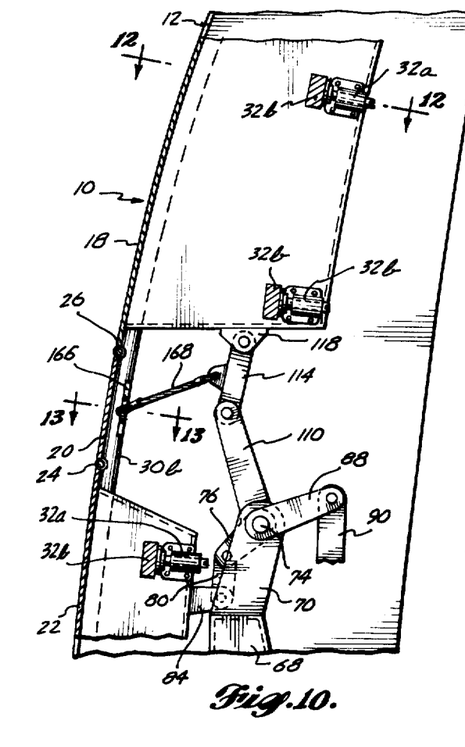
FIG. 10 is an enlarged side view of the door when closed showing the seal retraction mechanism for retracting the side portions of the door seal.
Figure 11:
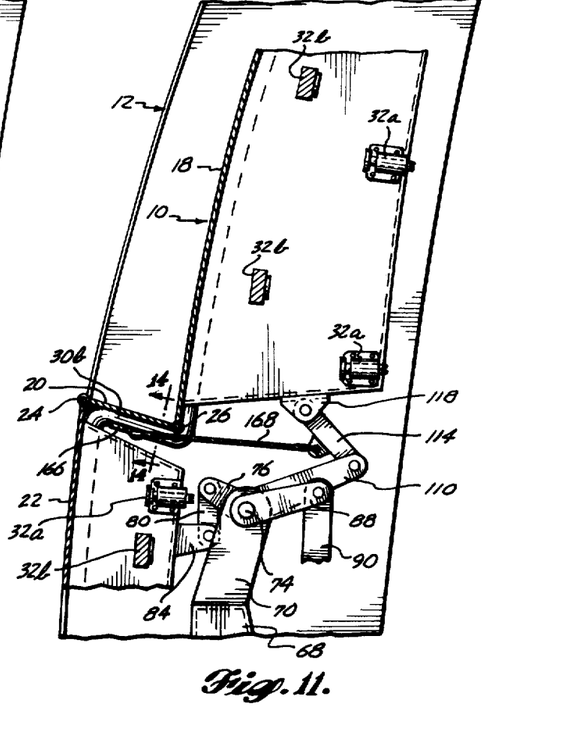
FIG. 11 is an enlarged side view of the door similar to FIG. 10 illustrating the door in the folded and unplugged position and showing the seal retraction mechanism when the seal is in a retracted position.
Figure 14:
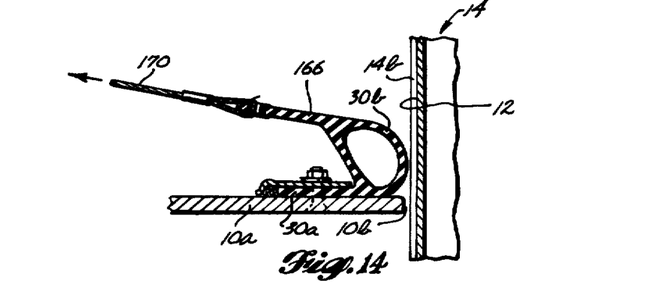
FIG. 14 is a sectional view taken along section line 14—14 of FIG. 11.

The only portion of the seal that is not completely separated from the shoulder 14b by the folding movement of the door segments is the central portion of the seal 30, generally indicated by numerals 30a and 30b, that reside on the ends of the intermediate segment 20 of the door. The central portions 30a and 30b of the seal are retracted away from the shoulder 14b as the door segments are folded by a relatively simple pull cord arrangement illustrated in FIG. 1 and in FIGS. 10, 11, 13 and 14. Referring to FIGS. 1, 10 and 13, the central portion 30a and 30b of the seal carry integral pull tabs 164 and 166. The pull tabs 164 and 166 are connected respectively by pull cords 168 and 170 to respective ones of the connecting links 114 and 116 for connecting the coupling arms 110 and 112 on folding shaft 74 to the upper segment 18 of the door. As previously described, as the shaft 74 is rotated in a counterclockwise direction, the arms 110 and 112 are swung forwardly relative to the door. This movement in turn swings the connecting links 114 and 116 forwardly as shown in FIG. 11. Since the inner end of the pull cords 168 and 170 are connected respectively to the coupling links 114 and 116, the forward movement of the links 116 and 114 will exert an inward pulling force on the cords, and thus on the tabs 164 and 166 coupled to the central portions 30a and 30b of the seal 30 as shown in FIG. 14. The inward movement of the pull cords will pull the seal 30 away from the doorway periphery sufficiently far to clear the shoulder 14b on the fuselage. Thus the seal 30 completely clears the entire periphery of the door and the shoulder 14b as the door segments are folded to allow unrestricted movement of the door outwardly through the door opening.

The present invention has been described in relation to a preferred embodiment. One of ordinary skill, after reading the foregoing specification, will be able to make various alterations, substitutions of equivalents and other changes without departing from the broad concept embodied in the door assembly disclosed. For example, a variety of actuating mechanisms for Z-folding the door can be substituted for the actuating mechanism 40. Moreover, the intermediate panel can, if desired, be divided into two generally horizontal segments with the two segments joined at their center by a third hinge. The intermediate segments could then fold into a W configuration as the upper and lower segments of the door move toward each other, thus accomplishing the same end result as the preferred embodiment illustrated and described. Other flexible members can also be employed to allow vertical foreshortening of the door.

As will be appreciated, the invention has been disclosed in the form of a preferred embodiment in which both the door opening and the door are generally shaped in the form of a hexagon. The invention is applicable, however, to any door assembly for closing an opening in a wall, provided that the sides of the opening and the door are convergent in a direction away from a line bisecting the door and the opening into two not necessarily equal parts. Thus, the broad concept of foreshortening a door in a directon transverse to the bisecting line can be employed with a door having an elliptical or polygonal shape. For a door having a periphery generally configured in the shape of a polygon with at least four sides, the sides of the polygon on either side of a line joining two nonadjacent apexes of the polygon are convergent. A door panel for such a polygonal opening has at least first and second end segments and a junction means for joining the first and second segments. The door panel for the polygonal opening has a peripheral edge portion that conforms to the shape of the polygon when the door is covering the opening. The first and second end segments of the door panel have adjacent edge portions that lie generally parallel to the line joining two nonadjacent apexes of the polygon. The junction means must so join the first and second end segments as to align them to completely close the opening when the door is covering the opening. An actuating means can also be associated with the first and second end segments and the junction means for moving the adjacent edge portions of the first and second end segments in generally opposing directions transverse to the line joining the nonadjacent apexes and thereby spacing the peripheral edge portions of the door panel from the periphery of the opening.

It is therefore intended that the grant of Letters Patent hereon be limited only by the definition contained in the appended claims.

The embodiments of the invention in which an exclusive property or privilege is claimed are as follows:

1. A door assembly for covering an opening in a wall, said opening having a periphery, said assembly comprising:

a door including a first end segment, an intermediate segment, and a second end segment, each of said segments having peripheral edge portions, first hinge means joining said first end segment to said intermediate segment for swinging movement relative to said intermediate segment along a first hinge axis, said first end segment being joined for swinging movement relative to said intermediate segment in a first rotational direction about said first hinge axis, second hinge means joining said second end segment to said intermediate segment for relative swinging movement along a second hinge axis spaced from and substantially parallel to said first hinge axis, said second end segment being joined for swinging movement about said second hinge axis relative to said intermediate segment in the same rotational direction as said first rotational direction, said first and second hinge means conjunctively mounting said first and second end segments for movement relative to each other between a first position spaced from each other and a second position wherein said first and second end segments are moved closer to each other in a direction transverse to said first and second hinge axes, the peripheral edge portions of said segments being so constructed and arranged relative to each other and to said opening that when said segments are in said first position said peripheral edge portions conform to the shape of said opening and reside adjacent the periphery of said opening, an actuating means operatively associated with at least one of said segments for moving said first and second end segments between said first and second positions, and door hinge means affixed to said wall adjacent said opening and attached to said door for mounting said door for swinging movement relative to said wall and said opening between a closed position wherein said door is located in said opening and an open position wherein said door is swung away from said opening.

2. The door assembly of claim 1 wherein said intermediate segment has a first dimension oriented in a direction transverse to said first and second hinge axes, said first dimension being small relative to the corresponding dimension of said first and second end segments.

3. The door assembly of claim 2 wherein said door hinge means mounts said door for swinging movement about a generally upright axis, said first and second hinge axes being oriented substantially transversely to said upright axis.

4. The door assembly of claim 1 wherein said wall has an inner side and an outer side, said door assembly further comprising:

stop means associated with said wall and said door for securing said door in said opening when said door is in a closed position, said stop means including at least one member having an inwardly facing engagement surface, said one member being affixed to said wall and extending into said opening, and at least a second member having an outwardly oriented engagement surface, said second member being affixed to said door and extending toward the periphery of said opening in proximity to said one member, said one and said second members being in mutual registration and said engagement surfaces being in mutual engagement when said door is in said closed position and said first position, said one and said second members being deregistered and said engagement surfaces being disengaged from each other when said door is in said second position.

5. The door assembly of claim 4 wherein said one and said second members extend in opposite directions and are mutually overlapping, whereby said engagement surfaces are in mutual engagement when said door is in said closed and said first position.

6. The door assembly of claim 4 wherein said one and said second members are a mating guide track and a follower that are mutually engaged when said door is in said closed and said first positions to react inwardly acting loads on said door.

7. The door assembly of claim 1 wherein said opening has a generally hexagonal shape, the peripheral edge portions of said door segments conforming to the shape of said opening when said door is in said closed and said first positions, and wherein said door has a longitudinal dimension running in a direction substantially transverse to said first and second hinge axes, said first and second end segments each having sides forming part of the peripheral edge portion of said door, said sides of each of said end segments converging as they extend away from said intermediate segment.

8. The door assembly of claim 7 further comprising:
stop means operatively associated with said door and said wall adjacent said opening when said door is in said closed and said first positions for securing said door in said opening against a force tending to push said door outwardly from said opening, said stop means being disengageable when said door is moved to said second position to allow said door to swing freely outwardly about said door hinge means.

9. The door assembly of claim 8 wherein said intermediate segment has a first dimension in a direction transverse to said first and second hinge axes, said first dimension being small relative to the corresponding dimension of said first and second end segments, said intermediate segment being located in the central portion of said door, said first and second end segments when moved to said second position translating toward each other in a direction generally transverse to said first and second hinge axes, the peripheral edge portions of said door moving away from the periphery of said opening as said first and second end segments move to said second position to free said door for swinging movement from said opening toward said open position.

10. The door assembly of claim 1 wherein said actuating means comprises:
a frame member,
a rotatable member mounted on said frame member and a manually actuatable opening handle affixed to and extending radially from said rotatable member,
first linkage means operatively coupled between said rotatable member and said first end segment for pulling said first end segment inwardly and toward said frame member reactive to rotation of said rotatable member,
second linkage means operatively coupled between said rotatable member and said second end segment for moving said second end segment outwardly and toward said frame member reactive to rotation of said rotatable member, said door being suspended from said frame member by said first and second linkage means, said hinge means being affixed to said frame member to mount said frame member and thus said door for swinging movement between said open and closed positions.

11. The door assembly of claim 1 further comprising: means associated with said actuating means for locking said first and second end segments in said second position in reaction to swinging movement of said door about said door hinge means.

12. The door assembly of claim 1 wherein said door hinge means comprises:

a first link pivotally coupled at one end to said fuselage adjacent said opening for movement about a first vertical axis, a second link pivotally coupled at one end to said fuselage adjacent said opening for movement about a second vertical axis, said second axis being offset outwardly relative to said wall from said first axis, a third link pivotally coupled at one end to the other end of said second link, the other end of said third link being pivotally coupled to said door at a location spaced from the peripheral edge portions of said door segments and being located between the pivotal connection of said second link to said third link and the pivotal connection of said second link to said fuselage, a fourth programming link pivotally coupled at its central portion to the central portion of said second link, said fourth programming link being pivotally coupled at one end to the other end of said first link, said fourth programming link being pivotally coupled at its other end to said door at a location between the pivotal connection of said third link to said door and the pivotal connection of said second link to said fuselage, said pivotal connections and said links being so constructed and arranged as to cause said door to swing through an arcuate path as said door is moved outwardly from said door opening, the arcuate path travelled by said door being greater than the arcuate path travelled by said first link.

13. The door assembly of claim 12 wherein the arcuate path through which said door travels is about 180°, and the arcuate path through which said first link travels is about 90°.

14. A plug type door assembly for an aircraft fuselage for covering an opening in the wall of said fuselage, said opening having a periphery, said door assembly comprising:

a door panel having upper, intermediate and lower segments, said segments having peripheral edge portions, said segments being serially arranged in a generally continuous path when said door is located in said opening and is in a closed position so that the peripheral edge portions of said segments lie adjacent the periphery of said opening so as to close said opening, disengageable stop means operatively associated with said opening and said door for securing said door in said opening against fluid pressure from within said fuselage when said door is in a closed position, seal means operatively associated with said opening and said door for sealing the peripheral edge portions of said segments to the periphery of said opening when said door is in a closed position, and means for joining said upper and lower segments to said intermediate segment so that said door can be folded at the junctions of the upper and lower segments with the intermediate segment into a generally Z-shaped configuration, said upper and lower segments moving generally downwardly and upwardly, respectively, as said door is folded to foreshorten said door in the upright dimension and space said upper and lower portions of said door from the periphery of said opening, said stop means being so constructed and arranged relative to said upper and lower segments as to disengage from said upper and lower segments when said door is folded to free said door for outward movement relative to said fuselage and said opening.

15. A door assembly for an opening in a wall, said opening having a periphery generally configured in the shape of a polygon having at least four sides, the sides of said polygon on either side of a line joining two nonadjacent apexes of said polygon being convergent, said assembly comprising:

a door panel having first and second end segments and junction means for joining said first and second end segments, said door panel having a peripheral edge portion that conforms to the shape of said polygon when said door is covering said opening, said first and second end segments having adjacent edge portions that lie generally parallel to said line, said junction means so joining said first and second end segments as to align said first and second end segments to completely close said opening when said door is covering said opening, actuating means associated with said first and second end segments and said junction means for moving said adjacent edge portions of said first and second and segments in generally opposing directions transverse to said line to foreshorten said door panel in a direction transverse to said line and thereby to space the peripheral edge portions of said door panel from the periphery of said opening.

16. The door assembly of claim 15 wherein said polygon has straight sides with smoothly rounded corners.

17. The door assembly of claim 15 wherein said polygon is generally shaped as a hexagon wiht smoothly rounded corners, said hexagon being symmetrical about an axis that is transverse to said line, said junction means comprising an intermediate segment of said door panel, first hinge means for joining said first end segment to said intermediate segment for swinging movement relative to said intermediate segment about a first hinge axis, second hinge means for joining said second end segment to said intermediate segment for relative swinging movement along a second hinge axis spaced from and substantially parallel to said first hinge axis, said first and second hinge axes being substantially parallel to said line.

18. A door assembly for an opening in a wall, said opening having a periphery, the sides of said opening converging toward each other as said sides extend away from a line extending across the central portion of said opening, said sides being convergent along a substantial portion of their length, said assembly comprising:

a door panel having first and second end segments and junction means for joining said first and second end segments, said door panel having a peripheral edge portion that conforms to the shape of the periphery of said opening when said door is covering said opening, said first and second end segments having adjacent edge portions that lie generally parallel to said line, said junction means so joining said first and second end segments as to align said first and second end segments with said opening to completely close said opening when said door is covering said opening, said peripheral edge portion including side portions that converge toward each other along a substantial portion of their length as they extend away from said line, actuating means associated with said first and second end segments and said junction means for moving said adjacent edge portions of said first and second end segments in generally opposing directions transverse to said line said door panel thereby being foreshortened in a direction transverse to said line and in a direction parallel to said line as said first and second end segments are moved in said generally opposing directions, thereby to space substantially the entire peripheral edge portion of said door panel from the periphery of said opening.

* * * * *